(12) United States Patent
Ellenbogen et al.

(10) Patent No.: US 10,338,214 B2
(45) Date of Patent: Jul. 2, 2019

(54) MODULAR IMAGING SYSTEM

(71) Applicant: Evolv Technologies, Inc., Waltham, MA (US)

(72) Inventors: Michael Ellenbogen, Wayland, MA (US); Michael Litchfield, Winchester, MA (US); Alec Rose, West Hartford, CT (US); Peter Conway, Waltham, MA (US)

(73) Assignee: Evolv Technologies, Inc., Waltham, MA (US)

( * ) Notice: Subject to any disclaimer, the term of this patent is extended or adjusted under 35 U.S.C. 154(b) by 418 days.

(21) Appl. No.: 15/089,357

(22) Filed: Apr. 1, 2016

(65) Prior Publication Data

US 2016/0291148 A1    Oct. 6, 2016

Related U.S. Application Data

(60) Provisional application No. 62/142,730, filed on Apr. 3, 2015.

(51) Int. Cl.
| | |
|---|---|
| *G01S 13/89* | (2006.01) |
| *G01S 13/86* | (2006.01) |
| *G01S 13/88* | (2006.01) |
| *G01S 13/04* | (2006.01) |
| *G01S 7/04* | (2006.01) |
| *H01Q 21/29* | (2006.01) |

(Continued)

(52) U.S. Cl.
CPC ............. *G01S 13/89* (2013.01); *G01S 7/04* (2013.01); *G01S 13/04* (2013.01); *G01S 13/867* (2013.01); *G01S 13/87* (2013.01); *G01S 13/887* (2013.01); *G01V 8/005* (2013.01); *H01Q 21/293* (2013.01); *G01S 13/86* (2013.01)

(58) Field of Classification Search
CPC .................................. G01S 13/887; G01S 7/04
USPC ......................................................... 342/22
See application file for complete search history.

(56) References Cited

U.S. PATENT DOCUMENTS

| | | | | |
|---|---|---|---|---|
| 9,791,553 B2* | 10/2017 | Rose | .......................... | G01S 7/41 |
| 2011/0163231 A1* | 7/2011 | Salmon | ................... | G01V 8/005 |
| | | | | 250/336.1 |

FOREIGN PATENT DOCUMENTS

| | | | | |
|---|---|---|---|---|
| EP | 1934628 A2 | 6/2008 | | |
| WO | WO-2007029226 A2 * | 3/2007 | ........... | G01S 13/888 |
| WO | WO-2007054685 A2 * | 5/2007 | ........... | G01K 11/006 |

\* cited by examiner

*Primary Examiner* — Peter M Bythrow
*Assistant Examiner* — Helena H Seraydaryan
(74) *Attorney, Agent, or Firm* — Mintz Levin Cohn Ferris Glovsky and Popeo, P.C.

(57) ABSTRACT

A modular imaging system includes an antenna panels, a sensor, and at least one data processor. The antenna panels include an array of antenna elements including at least two antenna elements separated by a spacing more than a half wavelength. The plurality of antenna panels are configurable to be spatially arranged and oriented with respect to one another to measure radar returns of an observation domain for a target. The sensor has a field of view overlapping the observation domain and for measuring an image. The at least one data processor forms part of at least one computing system and is adapted to receive data characterizing the optical image and the radar returns, determine a spatial location of the target, and construct a radar return image of the target using a sparsity constraint determined from the spatial location of the target. Related apparatus, systems, techniques, and articles are also described.

21 Claims, 14 Drawing Sheets

(51) Int. Cl.
*G01V 8/00* (2006.01)
*G01S 13/87* (2006.01)

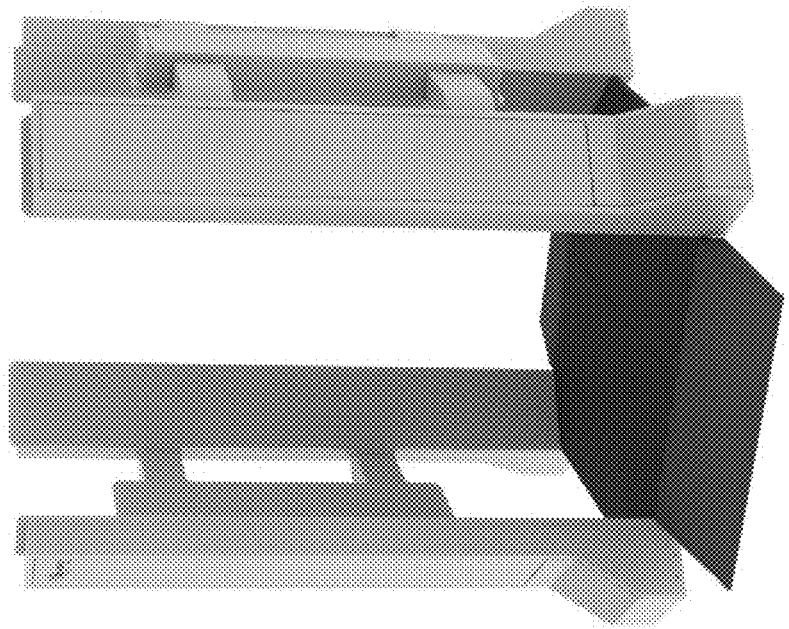
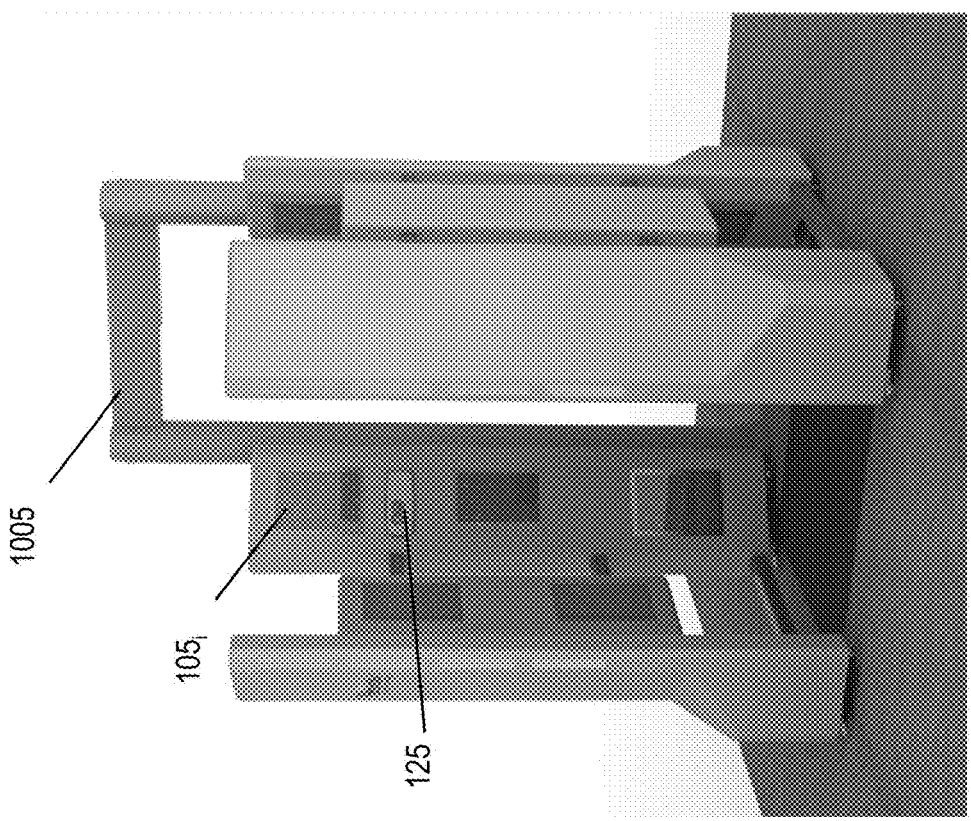
FIG. 10A
FIG. 10B

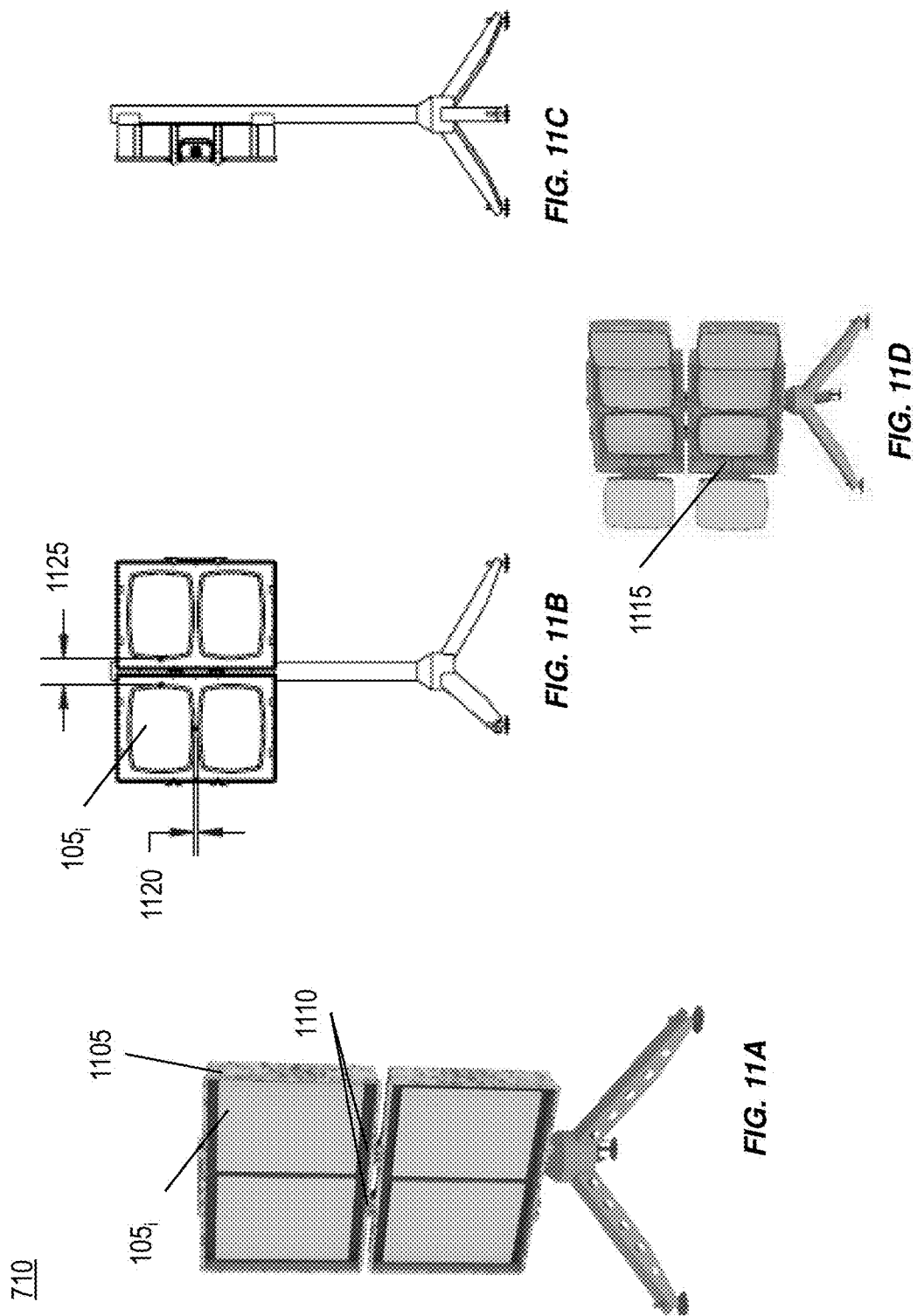

MODULAR IMAGING SYSTEM

RELATED APPLICATIONS

This application claims priority under 35 U.S.C. § 119 to U.S. Provisional patent application No. 62/142,730 filed Apr. 3, 2015, the entire contents of which is hereby expressly incorporated by reference herein.

TECHNICAL FIELD

The subject matter described herein relates to a modular imaging system, for example, with multiple antenna panels that can be modularly assembled.

BACKGROUND

Airport security attempts to prevent any threats or potentially dangerous situations from arising or entering the country. Some existing radio frequency (RF) imaging systems (such as those utilized by airport security for passenger screening) are large, expensive, and require individuals to remain stationary while an antenna rotates around the stationary individual to capture an image. In addition, these existing RF imaging systems may be limited to checkpoint security screening and may not reconfigure for other applications.

SUMMARY

In an aspect, a modular imaging system includes a plurality of antenna panels, a sensor and at least one data processor. The plurality of antenna panels include an array of antenna elements including at least two antenna elements separated by a spacing more than a half wavelength. The plurality of antenna panels are configurable to be spatially arranged and oriented with respect to one another to measure radar returns of an observation domain for a target. The sensor has a field of view overlapping the observation domain and for measuring an image. The at least one data processor forms part of at least one computing system and is adapted to receive data characterizing the optical image and the radar returns, determine a spatial location of the target using the data characterizing the image, and construct a radar return image of the target using a sparsity constraint determined from the spatial location of the target.

In another aspect, data characterizing radar returns measured by a plurality of antenna panels comprising an array of antenna elements including at least two antenna elements separated by a spacing more than a half wavelength is received. The plurality of antenna panels are configurable to be spatially arranged and oriented with respect to one another to measure radar returns of an observation domain for a target. Data characterizing an image containing the observation domain and measured by a sensor having a field of view overlapping with the observation domain is received. A spatial location of the target is determined using the data characterizing the image. A radar return image of the target is constructed using a sparsity constraint determined from the spatial location of the target.

One or more of the features disclosed herein including the following features can be included in any feasible combination. For example, a base station can be included, the base station to at least receive the radar returns from the plurality of antenna panels and generate the data characterizing the radar returns as in-phase and quadrature data. The at least one data processor forming part of at least one computing system can be further adapted to detect for a presence of threat objects in the radar return image. A display can be included. The at least one data processor forming part of the at least one computing system can be further adapted to render, in the display, characterizations of the detected threat objects. The spatial location of the target can define empty voxels and voxels in which the target is present. The plurality of antenna panels can be configurable to be spatially arranged and oriented with respect to one another based on an intended application. The plurality of antenna panels can be configurable to be spatially arranged vertically adjacent to inspect targets moving through the observation domain.

Data characterizing the radar returns can be generated as in-phase and quadrature data and by a base station receiving the radar returns from the plurality of antenna panels. A presence of threat objects can be automatically detected for in the radar return image. Characterizations of the detected threat objects can be rendered in a display. The spatial location of the target can define empty voxels and voxels in which the target is present. The plurality of antenna panels can be configurable to be spatially arranged and oriented with respect to one another based on a given application. The plurality of antenna panels can be configurable to be spatially arranged vertically adjacent to inspect targets moving through the observation domain.

The plurality of antenna panels can include four approach panels and four rearward panels. The four approach panels can be arranged vertically with respect to one another and coplanar in a first plane. The four rearward panels can be arranged vertically with respect to one another and coplanar in a second plane. An angle between the first plane and the second plane can be between 10 degrees and 170 degrees. The angle between the first plane and the second plane can be between 60 degrees and 120 degrees. The four approach panels can span a vertical distance less than 160 centimeters and each panel's vertical dimension can be between 20 and 30 centimeters. The plurality of antenna panels can further include a second set of four approach panels and a second set of four rearward panels, with a pass-through region between the four approach panels and the second set of approach panels.

A housing can be included. The housing can have a first hinge to fold the housing, the housing coupled to the plurality of antenna panels, the plurality of antenna panels including four panels coplanar in a first plane. The plurality of antennas can further include a fifth panel coupled to the housing with a second hinge. The system can be collapsible by folding the housing using the first hinge so that each panel in the plurality of antenna panels is enclosed by the housing. When the housing is in a closed position, a largest dimension of the housing can be less than 50 centimeters, and a second dimension of the housing can be between 27 centimeters and 40 centimeters.

The plurality of antenna panels can include at least nine coplanar panels in a row and column arrangement, each panel separated from a neighboring panel by between 4 and 8 centimeters.

The plurality of antenna panels can include a first set of two approach panels and a second set of two approach panels. The first set of two approach panels can be arranged vertically with respect to one another and coplanar in a first plane. The second set of two approach panels arranged vertically with respect to one another and coplanar in a second plane. An angle between the first plane and the second plane can be between 100 and 170 degrees. The two approach panels in the first set can be separated vertically by between 30 and 60 centimeters.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 10A and 10B illustrate another variation of the security checkpoint configuration in which the panels are arrange in substantially cylindrical arrangement to improve inspection viewing angles;

FIGS. 11A-D illustrate a field access/portable arrangement in more detail;

Like reference symbols in the various drawings indicate like elements.

DETAILED DESCRIPTION

The current subject matter can include an RF imaging system including multiple antenna panels that can be modularly assembled, scaled, and independently arranged based on an intended application. Moreover, the RF imaging system can include an optical sensor to provide for compressed sensing to reduce the amount of data acquired and processed thereby reducing the RF imaging system's size and cost requirements.

The antenna panels can be connected to a base station for data processing, which can be connected to a computing device for automatic image generation, threat detection, and viewing of images. The system can detect threats, such as knives, guns, explosives, and the like, carried on an individual. Each antenna panel can act as a building block of a whole system such that controlling the number of antenna panels and their orientation with respect to an observational domain allows the system to be configured for different applications.

In addition, each antenna panel can include a sparse array of antenna elements enabling images to be acquired using compressive sensing thereby reducing the amount of data acquired, which, in turn, reduces the amount of data that must be processed. A sensor, such as a video camera, can be included to determine a target's spatial location for enforcing compressed sensing sparsity constraints.

Figure 1:
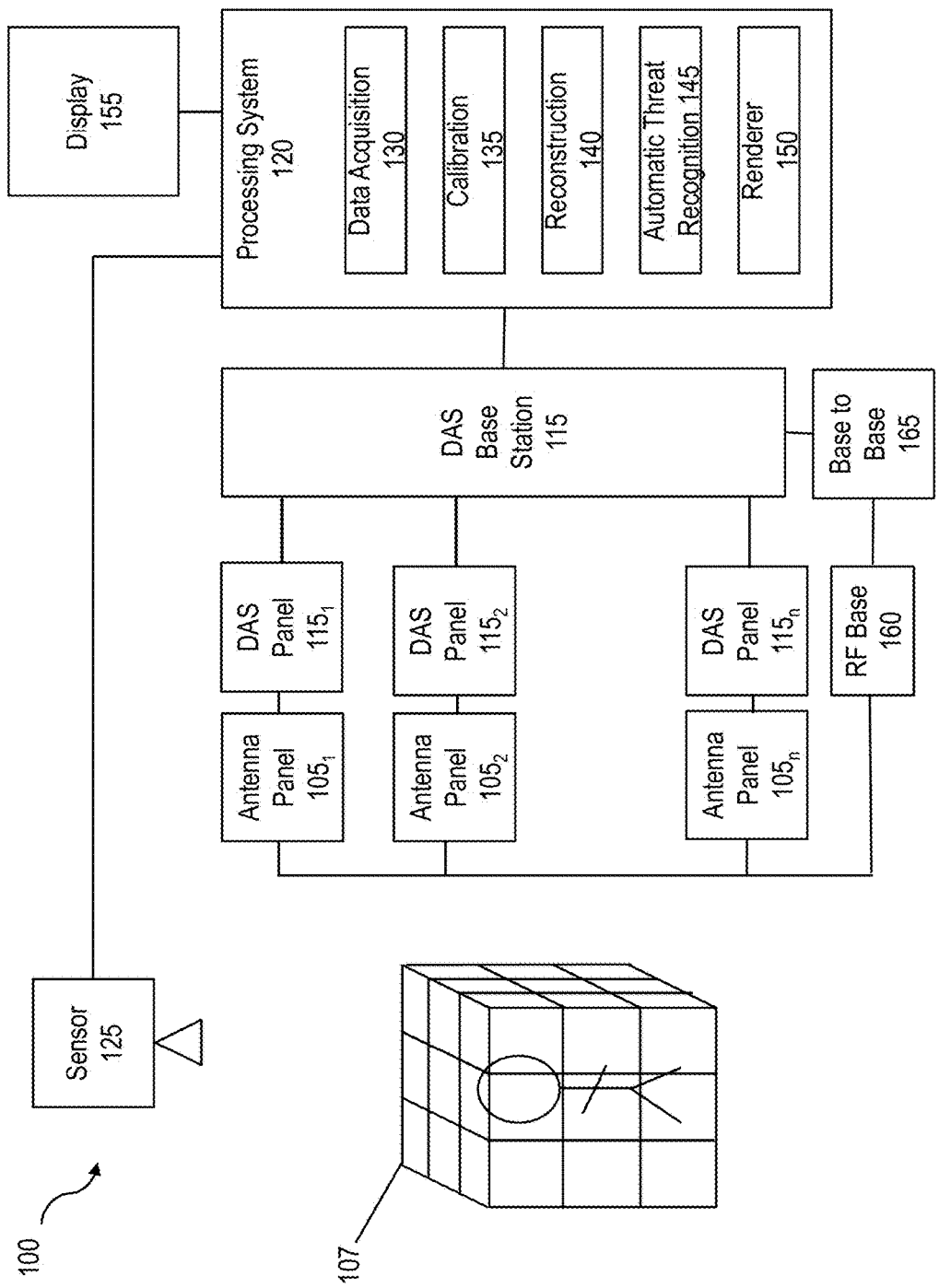
FIG. 1 is a system block diagram of an example modular imaging system including multiple antenna panels that can be modularly assembled, scaled, and arranged.

FIG. 1 is a system block diagram of an example modular imaging system 100 including multiple antenna panels $105_i$ (i=1, 2, . . . , n) that can be modularly assembled, scaled, and arranged; a data acquisition system (DAS) panel $110_i$ (i=1, 2, . . . , n) for controlling the antennas across the multiple antenna panels $105_i$ and digitizing raw radar return data specific to itself; a DAS base station 115 for aggregating the digital data from multiple DAS panels $110_i$; a RF Base Station 160 for driving antenna panels $105_i$; a processing system 120 for analyzing the radar returns; a display 155 for providing output; and a Base to Base board 165 for interfacing the RF Base Station 160 to the processing system 120. The example modular imaging system 100 can include an optical sensor 125.

Figure 2:
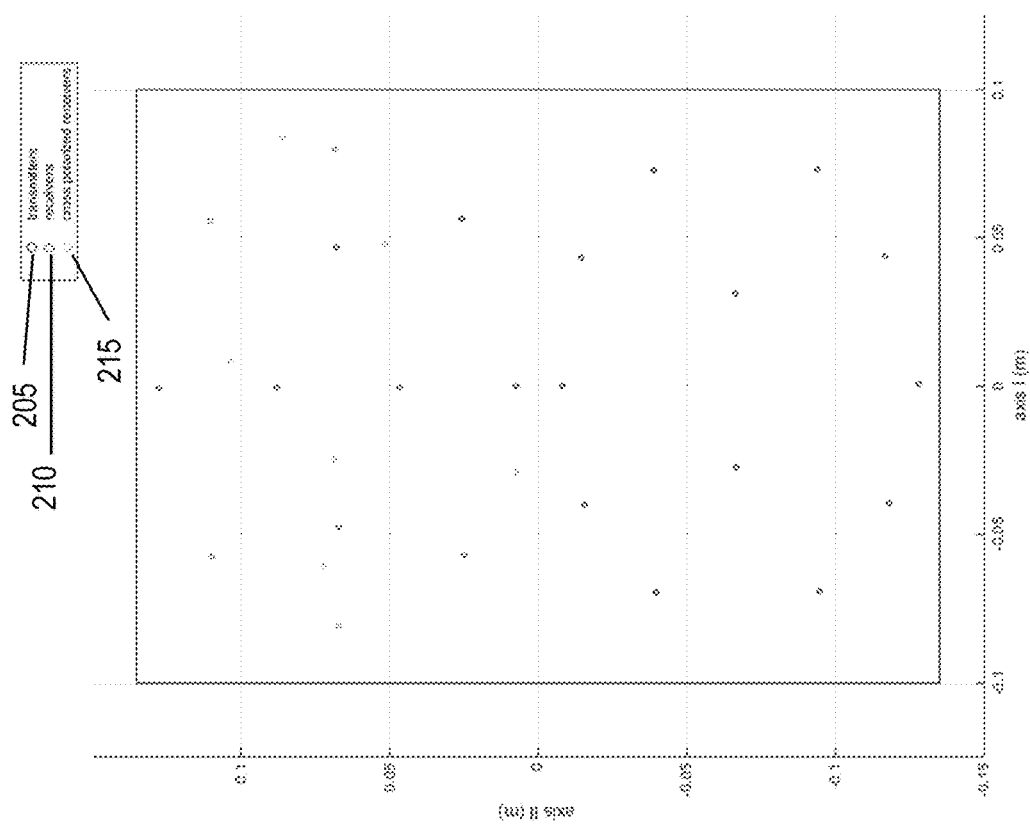
FIG. 2 is an example layout of an antenna panel that contains sparsely distributed antenna elements.

Each antenna panel $105_i$ includes antenna elements that are sparsely distributed across the face of the antenna panel $105_i$ to enable compressed sensing of observation domain 107. Antenna elements can be considered sparsely distributed if a spacing of more than a half-wavelength (of an operating frequency) separates the elements. FIG. 2 is an example layout of an antenna panel $105_i$ that enables compressed sensing. For any arbitrarily sized and shaped panel, the layout and position of transmitters 205 and receivers 210 can be determined through numerical optimization methods (e.g., Monte-Carlo methods) by simulations using the criterion of: (1) maximally flat singular value decomposition (SVD) for a resulting measurement matrix (e.g., measures the uniqueness of all measurements); (2) maximum distance between effective monostatic sensor locations (e.g., center of mass for every combination of transmitter and receiver); and (3) no violations of physical board dimensions and RF layout considerations (e.g., no overlapping antennas, and transmitters and receivers confined to opposite parts of the board). The layout and position of transmitters 205 and receivers 210 can be represented by inter-panel effective sensor locations 215, which can include the effective Mono-Static transmit, receive 3D spatial location of a trace.

In the example layout of an antenna panel $105_i$ illustrated in FIG. 2, each antenna panel $105_i$ is a 27.6 cm×20.0 cm panel including 12 transmitting antennas 205 and 12 receiving antennas 210 that can be selected and controlled independently (e.g., to transmit/receive), although other configurations are possible. The antennas can be shaped and located structures printed on the front surface of a multi-layer printed circuit board assembly (PCBA). In an implementation, the modular imaging system's 100 transmit operating frequencies are between 24 and 29.5 GHz (millimeter wave signals). In another implementation, the modular imaging system's 100 transmit operating frequencies include 60 GHz. In an implementation, during operation a single panel system can serially generate 12 swept frequency traces, 1 at each transmitter, one at a time. For each transmitter frequency sweep, the echoed signal can be received on all 12 receivers in parallel and compared against the transmitted signal (e.g., Local Oscillator from RF Base 160) thereby recording 144 transmit-receive Bi-Static Antenna Pair FMCW traces. Each trace's range information is relative to the "mid-point of the line" between that trace's associated transmitting and receiving antennas. For a two panel system there are 2 panels*12 transmitters per panel*2 panela*12 receivers per panel resulting in 576 transmit receive pairs. For N panels there are N*N*12*12 pairs. The number of pairs increase with the square of the number of panels. There is a rapid increase in spatial diversity of antenna locations as a function of the number of panels included in a system.

Figure 3B:
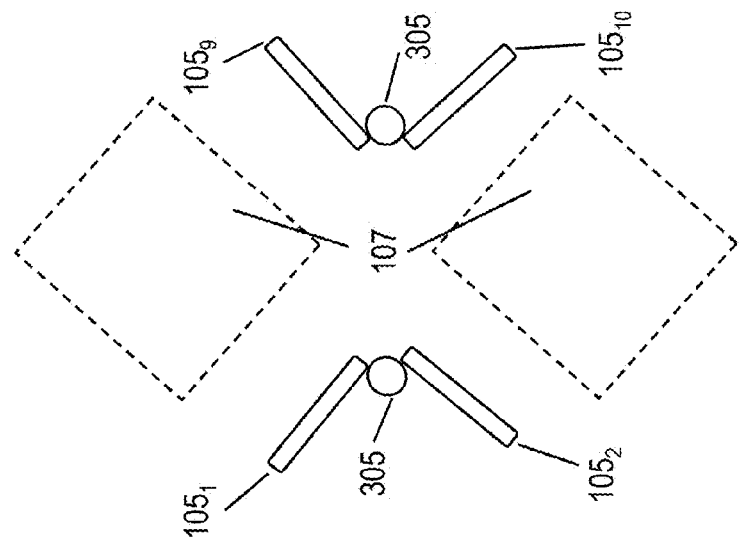
FIG. 3B is a top view of the antenna panel configuration illustrated in FIG. 3A.
Figure 3A:
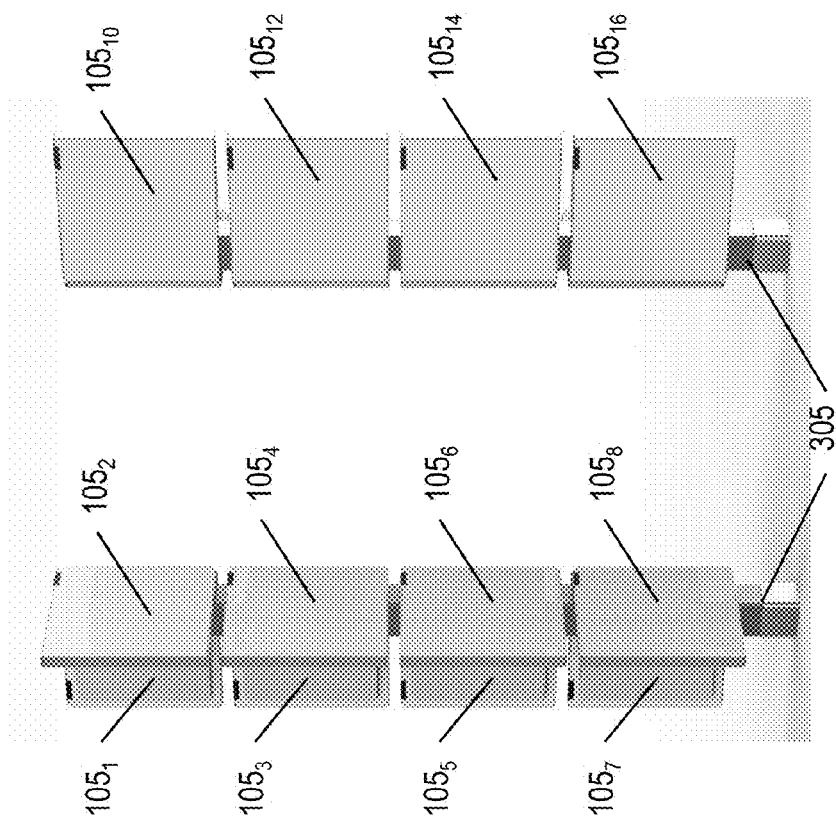
FIG. 3A is an illustration of antenna panels arranged in a walk-thru checkpoint screening concept of operation.

In addition, antenna panels $105_i$ can be arranged in various configurations and orientations with respect to one another to illuminate an observational domain (OD) 107. Moreover, the system is capable of having an expandable number of antenna panels $105_i$. The number, configuration, and orientations of the antenna panels $105_i$ can define customizable ODs based on an intended application. In other words, the modular imaging system 100 can support multiple concepts of operation. For example, FIG. 3A is an illustration of antenna panels $105_i$ arranged in a walk-thru checkpoint screening concept of operation and FIG. 3B is a top view of the antenna panels $105_i$. Sixteen antenna panels $105_i$ (i=1, 2, . . . , 16) are spatially arranged in groups of four that are vertically adjacent (e.g., in a stacked configuration) and oriented with respect to one another to illuminate an OD 107 having two regions. More specifically, the antenna panels $105_i$ are attached to one of two posts 305. Individuals or other targets can walk between the posts 305 thereby moving through the OD 107 regions. By having individuals move through the OD 107 while the modular imaging system 100 is configured as illustrated in FIGS. 3A and 3B, the modular imaging system can illuminate both the front, sides, and rear of the target, and generate one or more images of the target.

Figure 4:
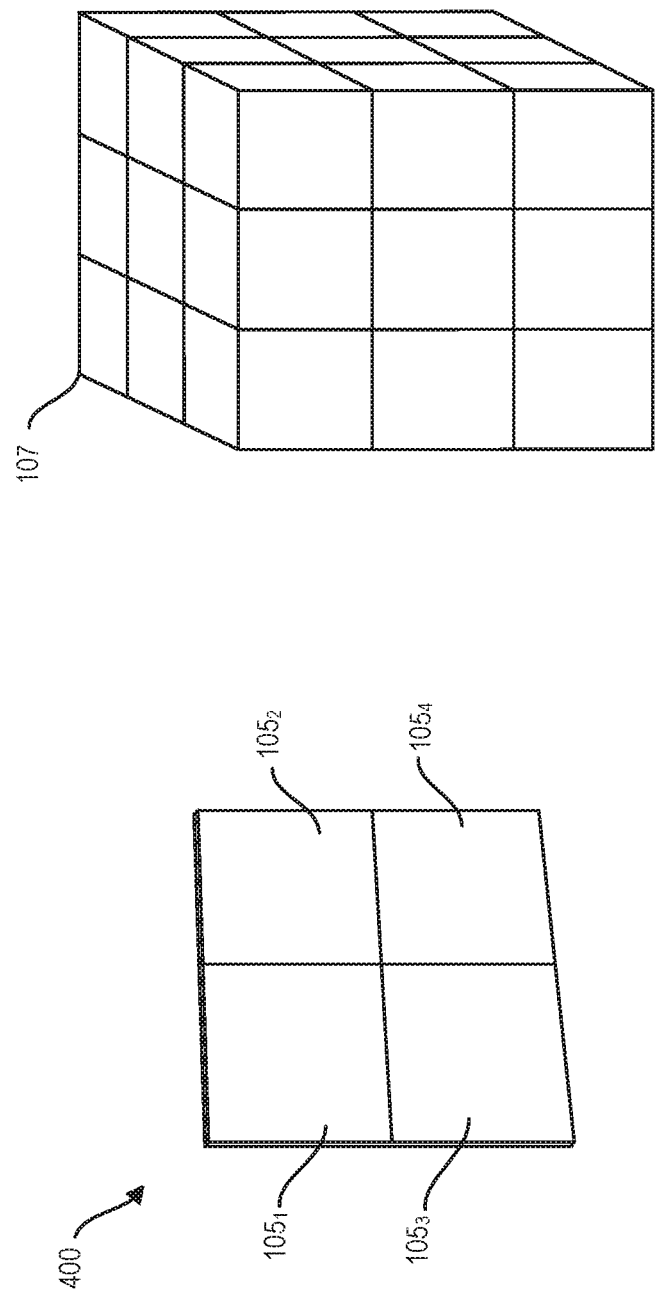
FIG. 4 is an illustration of four antenna panels arranged as a large flat panel.

Additional concepts of operation are possible. For example, FIG. 4 is an illustration of four antenna panels $105_i$ arranged as a large flat panel 400. The four antenna panels $105_i$ can be oriented to illuminate an intended OD (e.g., to scan individuals walking past). The antenna panels $105_i$ can be arranged to illuminate the subject being screened, eliminating blind spots, and thereby improving overall detection performance with a lower false alarm rate.

Figure 7:
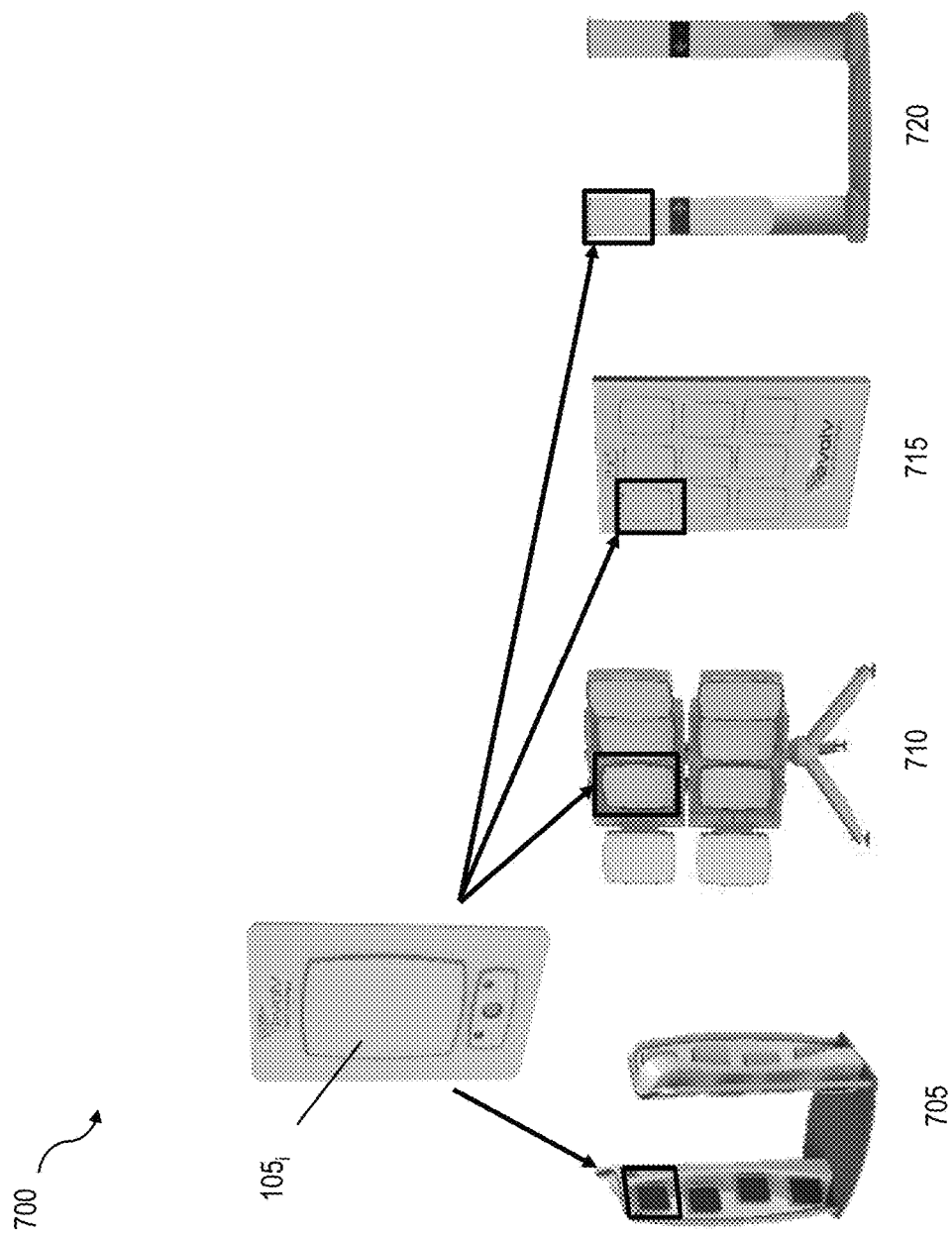
FIG. 7 illustrates further additional concepts of operation.

FIG. 7 illustrates further additional concepts of operation. As described more fully with reference to FIGS. 8-14, the antenna panels $105_i$ are arranged in a security checkpoint configuration at 705; in a field access/portable arrangement at 710; in a pass-by area configuration at 715; and an access and chokepoint configuration at 720.

Figure 8C:
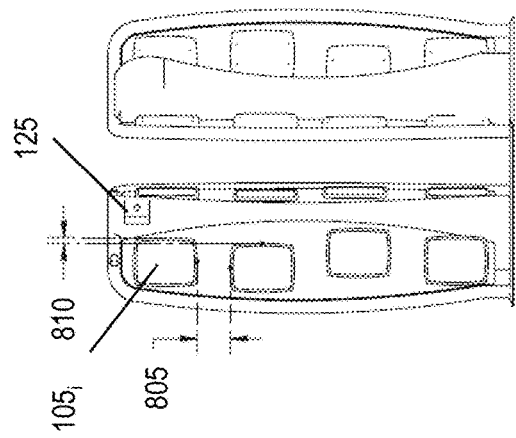
FIGS. 8A, 8B, and 8C illustrate the security checkpoint configuration 705 in more detail.
Figure 8A:
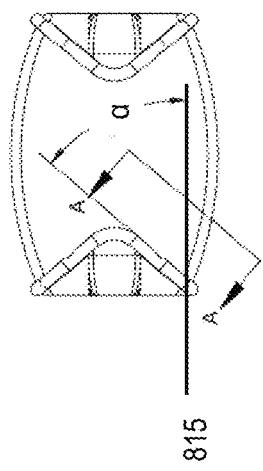
Figure 8B:
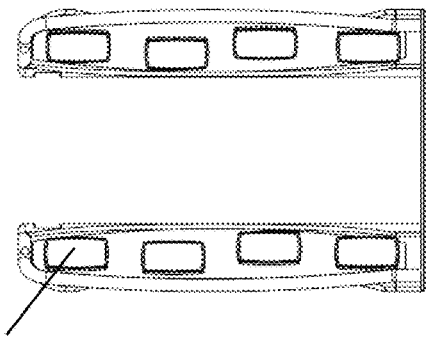

FIGS. 8A, 8B, and 8C illustrate the security checkpoint configuration 705 in more detail. FIG. 8A is a cross-sectional diagram, FIG. 8B is a front view, and FIG. 8C is a side perspective view illustrating the security checkpoint configuration. The security checkpoint configuration illustrated in FIG. 8A-C has two posts, each post having four approach (or forward facing) panels arranged vertically with respect to one another and four rearward panels arranged vertically with respect to one another. Each grouping of four panels is referred to as a set of panels. The approach panels in a given set are substantially coplanar in a first plane (e.g., the face of the panels have substantially parallel normal). The rearward facing panels in a given set are substantially coplanar in a second plane. A pass-through region between the two posts (e.g., the first set of four approach panels and the second set of approach panels) allows for inspection of individuals or other targets passing through the posts.

In some implementations, the angle of the first plane a as measured to a transverse axis 815 can vary between 10 and 85 degrees. In an example implementation, the angle α is 50 degrees. An angle of the second plane can similarly be between 10 and 85 degrees. Thus, an angle between the first plane and the second plane can be between 10 degrees and 170 degrees, 60 and 120 degrees, and in the example implementation, the angle between the first plane and the second plane is 110 degrees. By controlling the angle of the antenna panels, the observation domain can be controlled.

Inter-panel spacing 805 in the vertical direction can vary and in an example implementation is 16.8 cm. Thus, with the example panels described above (in which each panel's vertical dimension is between 20 and 30 centimeters) and in the security checkpoint panel configuration, the four approach panels span a vertical distance less than 160 centimeters. Inter-panel offset 810 can be 2.9 cm, which can allow for improved resolution of the observational domain.

Figure 9B:
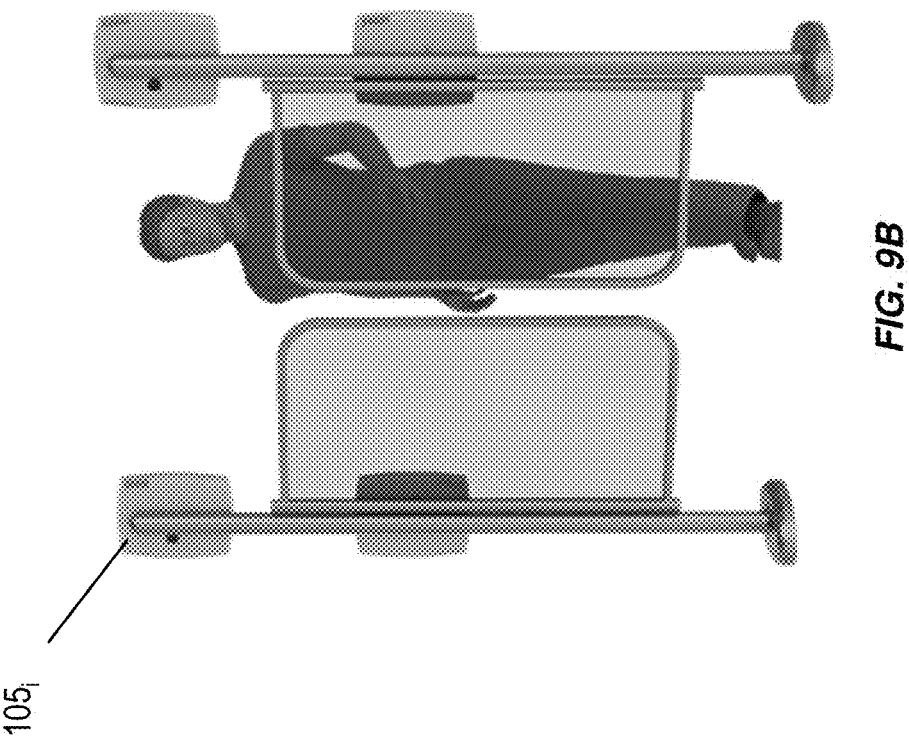
FIG. 9B illustrates another variation of the security checkpoint configuration in which two panels are used overtly to screen individuals at an access point.
Figure 9A:
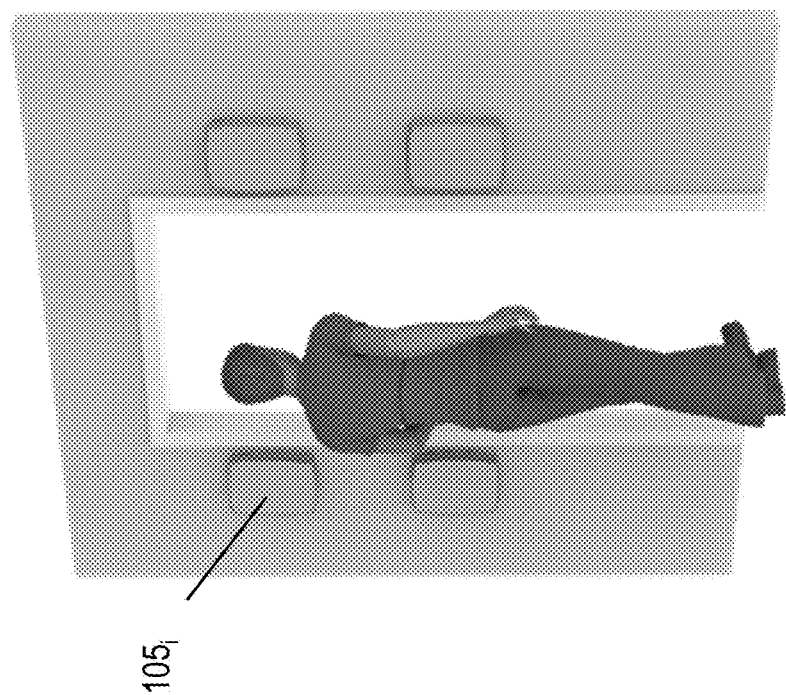
FIG. 9A illustrates a variation of the security checkpoint configuration that can covertly integrate into a doorway.

FIG. 9A illustrates a variation of the security checkpoint configuration in which four panels $105_i$ (two on each side) are used (for approach facing and/or rearward facing) and can covertly integrate into a doorway. Thus, the current subject matter can provide for covert monitoring and screening of individuals as they pass through a doorway, which serves as a natural checkpoint. FIG. 9B illustrates another variation of the security checkpoint configuration in which two panels are used overtly to screen individuals at an access point, for example, a turnstile for admitting individuals to public transportation, event space, or to a building. The current subject matter can scan an individual and only authorize admittance if no threats are detected.

FIGS. 10A and 10B illustrates another variation of the security checkpoint configuration in which the panels $105_i$ are arrange in substantially cylindrical arrangement to improve inspection viewing angles. The security checkpoint configuration is shown with (FIG. 10A) and without (FIG. 10B) a traditional metal detector 1005.

FIGS. 11A, 11B and 11C illustrate a field access/portable arrangement 710 in more detail. The field access/portable arrangement 710 includes a housing 1105 having a first hinge 1110 to fold the housing 1105. The housing 1105 is coupled to four antenna panels $105_i$, which are coplanar when the housing is open. The field access/portable arrangement is collapsible by folding the housing 1105 using the first hinge 1110 so that each panel $105_i$ is contained or enclosed by the housing.

Inter-panel spacing 1120 and 1125 can vary and in an example implementation can be 1.2 cm and 8.9 cm, respectively. Thus, with the example panels described above (in which each panel's vertical dimension is between 20 and 30 centimeters) and in the field access portable arrangement 710, the four panels span a first distance (e.g., height or width) that is less than 50 centimeters, and span a second distance (e.g., width or height, respectively) of the housing 1105 of less than 40 centimeters.

The housing 1105 can fold into a brief-case-like shape for portability. For example, in an example implementation, when the housing 1105 is closed, a largest dimension (e.g., length) of the housing can be less than 50 centimeters, and a second dimension (e.g., height) of the housing is between 27 centimeters and 40 centimeters.

As illustrated in FIG. 11D, the housing 1105 can further include additional hinges 1115 coupling additional antenna panels 105$_i$ to the housing 1105.

Figures 12A, 12B, 12C:
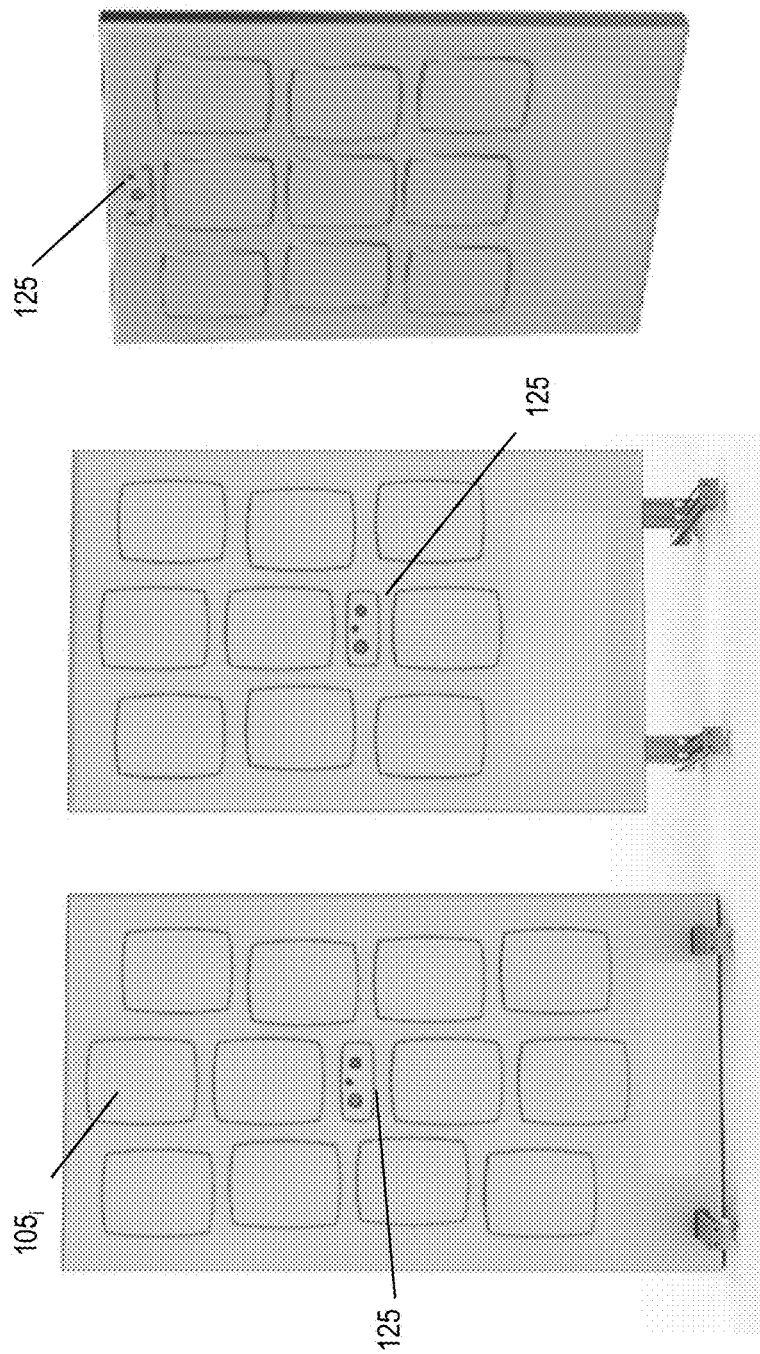
FIGS. 12A-C illustrate several implementations of a pass-by area configuration.
Figure 13B:
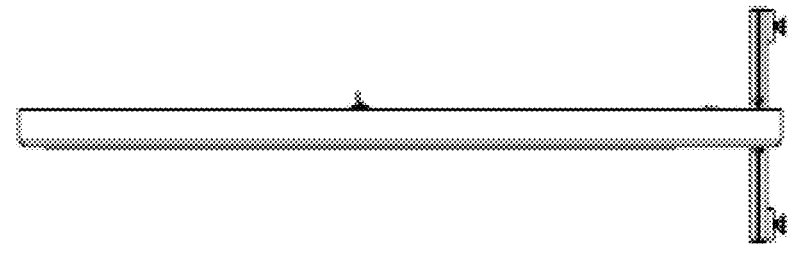
FIGS. 13A and 13B illustrate dimensions of the example implementation illustrated in FIG. 12A.
Figure 13A:
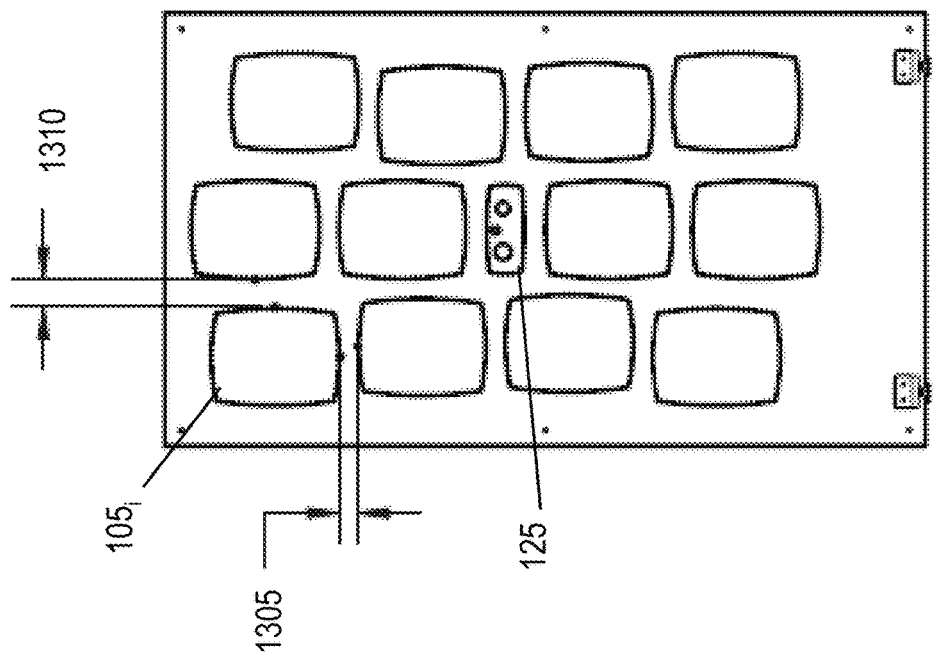

FIG. 12A-C illustrates several implementations of a pass-by area configuration 715. FIGS. 13A and 13B illustrate dimensions of the example implementation illustrated in FIG. 12A. The pass-by area configuration can include multiple coplanar antenna panels 105$_i$. In FIGS. 12A and 13A-B, twelve coplanar panels 105*i* are arranged in a 4 by 3 arrangement, each panel 105$_i$ separated from a neighboring panel by inter-panel spacing 1305 and 1310 of between 4 and 8 centimeters, respectively. In FIGS. 12B and 12C, nine coplanar panels 105$_i$ are arranged in a 3 by 3 arrangement.

FIGS. 14 A-C illustrates several views of an access and chokepoint configuration 720.

Figure 14C:
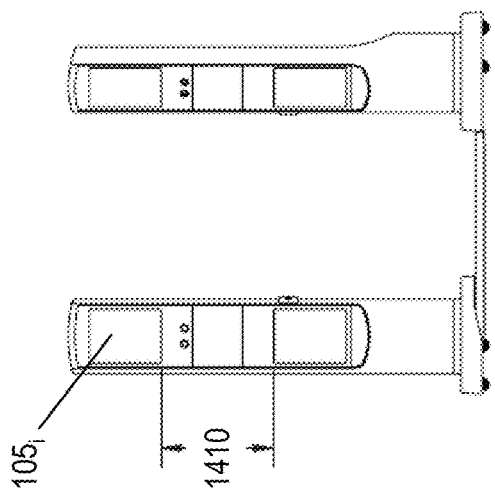
FIGS. 14A-C illustrates several views of an access and chokepoint configuration.
Figure 14A:
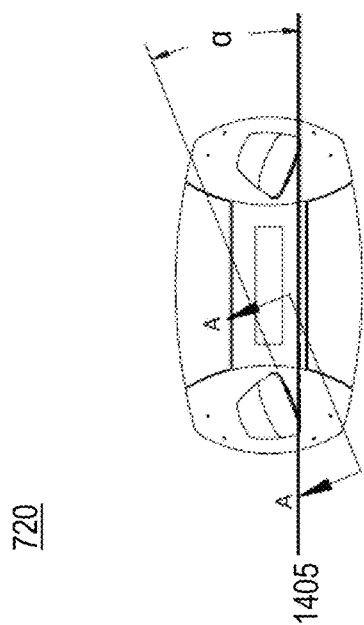
Figure 14B:
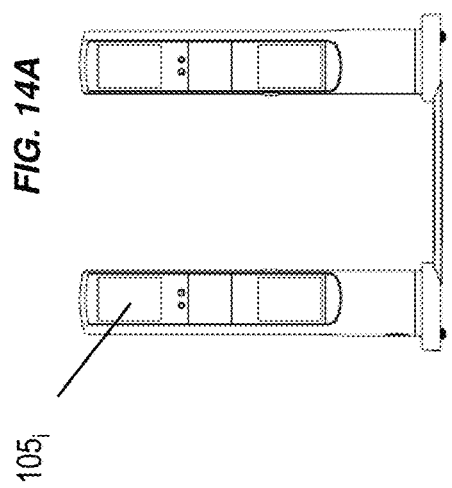

FIG. 14A is a cross-sectional diagram, FIG. 14B is a front view, and FIG. 14C is a side perspective view illustrating the access and chokepoint configuration. The configuration illustrated in FIG. 14A-C has two posts, each post having two approach (or forward facing) panels arranged vertically with respect to one another. Each grouping of two panels is referred to as a set of panels. The approach panels in a given set are substantially coplanar in a first plane (e.g., the face of the panels have substantially parallel normal). A pass-through region between the two posts (e.g., the first set of two approach panels and the second set of approach panels) allows for inspection of individuals or other targets passing through the posts.

In some implementations, the angle of the first plane a as measured to a transverse axis 1405 can vary between 10 and 85 degrees. In an example implementation, the angle α is 22 degrees. An angle of the second plane can similarly be between 10 and 85 degrees. Thus, an angle between the first plane and the second plane can be between 100 degrees and 170 degrees, and in the example implementation, the angle between the first plane and the second plane is 134 degrees. By controlling the angle of the antenna panels, the observation domain can be controlled.

Inter-panel spacing 1410 in the vertical direction can vary and in an example implementation is 45.8 cm. Thus, with the example panels described above (in which each panel's vertical dimension is between 20 and 30 centimeters) and in the access and chokepoint panel configuration, the two approach panels in a given set are separated vertically by between 30 and 60 centimeters and span a vertical distance less than 120 centimeters.

Referring again to FIG. 1, modular imaging system 100 can include data acquisition system (DAS) panel 110$_i$ (i=1, 2, . . . , n) for each antenna panel 105$_i$. DAS panel 110$_i$ digitizes raw RF data received from its associated antenna panel 105$_i$ and bundles the data for transmission to a DAS base station 115. DAS base station 115 receives the digitized raw RF data from each of the DAS panels 110$_i$, aggregates the received data, and transmits the aggregated data as in-phase and quadrature data to a processing system 120. In some implementations, DAS base station 115 transmits data to processing system 120 via a universal serial bus (USB) 3.0 connection.

Modular imaging system 100 can include RF base 160 capable of generating an RF local oscillator reference signal that can be distributed to antenna panels 105$_i$. In some implementations, the reference signal can establish a fully phase coherent imaging system across all receive-transmit antenna pairs and across all antenna panels 105$_i$.

Modular imaging system 100 can include sensor 125 such as an infrared (IR) camera, thermal camera, ultrasonic distance sensor, video camera, electro-optical (EO) camera, or surface/depth map camera. Sensor 125 creates an additional information image or video, such as an optical image, of at least the OD 107. In some implementations, sensor 125 transmits images or video via a USB connection to processing system 120 for further analysis. The modular imaging system 100 can include multiple sensors 125. Sensor 125 can also be used to detect for the presence of a target in the OD 107. Detecting the presence of a targeted in the OD 107 can be used to trigger RF scanning by the imaging system 100.

Processing system 120 includes a number of modules for processing radar return data and additional information images from sensor 125 of the OD 107 including data acquisition process 130, calibration process 135, reconstruction process 140, automatic threat recognition process 145 and renderer 150.

Data acquisition process 130 acquires raw data from the DAS base station 115 and additional information images from the sensor 125. For each sensor (e.g., antenna panel 105$_i$ and sensor 125), data acquisition process 130 acquires and normalizes the sensor data. Timing of the sensor data is synchronized across sensors and data acquisition process 130 publishes the acquired data as frames (e.g., time slices) for further analysis by modular imaging system 100. Thus, for a given frame, data acquisition process 130 publishes a set of data for each antenna panel 105$_i$ and sensor 125. In some implementations, data is acquired and frames are published at near video frame rates (e.g., approximately 24 frames per second).

Calibration process 135 applies calibration to the published data.

Reconstruction process 140 transforms the calibrated radar return data into images and/or feature maps using compressed sensing constraints. An image can be created for each antenna panel 105$_i$, and/or based on a composite of measurements obtained by multiple antenna panels 105$_i$. Because measurements of the OD 107 are sparsely acquired via antenna panels 105$_i$, reconstructing an image of the OD 107 can be considered as finding solutions to an underdetermined linear system. Compressed sensing is a signal processing technique for efficiently acquiring and reconstructing a signal (e.g., an image of the target residing in OD 107), by finding solutions to underdetermined linear systems. The solution may be found using, e.g., matched-filter, least-squares, and like solution algorithms. Compressed sensing is based on the principle that, through optimization, the inherent information sparsity and a-priori knowledge of many features of that information when considering one has knowledge of items or subjects that may occupy the OD can be exploited to recover the images of interest from far fewer samples than required by the Shannon-Nyquist sampling theorem.

Image data from the sensor 125 can be used to further enforce the sparsity constraint beyond that supplied by a-priori knowledge of items or subjects that may occupy the OD. Specifically, an image of the OD 107 acquired by sensor 125 can be used to determine a spatial location of the target (e.g., which voxels of the OD 107 the target resides in and which voxels of the OD 107 are empty). Empty voxels contain no scatterers and therefore can be considered zero for compressed sensing reconstruction (e.g., enabling better and/or quicker estimations of the solution to the underdetermined linear system).

In addition, an appropriate sized OD 107 can result in a scene that is sufficiently sparse for compressed sensing reconstruction. For example, if an OD 107 is a volume that is 2 meters by 1 meter by 0.5 meters, and is divided into 8,000,000 voxels of 5 mm, a typical human located within this OD 107 would occupy only about 10% of the voxels at any moment (e.g., approximately 800,000 voxels). An image from a sensor 125 can be used to determine three-dimensional surfaces within the OD 107 volume and consequently which voxels the individual resides in. The empty voxels can be forced to zeros when reconstructing the radar return image while non-zeroed voxels can be altered during reconstruction (e.g., can be considered variables to find an optimal reconstructed solution to the underdetermined linear system).

Reconstruction process 140 can reconstruct one or more images. For example, each panel can serve as a transmit/receive pair and can be treated independently. For N panels, there are $N^2$ independent "effective apertures," each with a unique center-of-mass. Reconstruction process 140 can reconstruct an image from each of these effective apertures. In addition, reconstruction process 140 can create aggregate images by combining multiple independent images. In addition, reconstruction process can treat all panels as one large sparse aperture and reconstruct a single image using the information acquired from all panels in the single aperture Reconstruction process 140 can generate feature maps from the reconstructed images. Feature maps can include scatterer return data or other characterizations or features of the radar return measurements. Statistical analysis can be performed across multiple images. Some example features include local surface normal, surface-width, surface smoothness/pointiness, summed magnitude, and the like. Other features are possible.

Automatic threat recognition process 145 analyzes radar return images and/or feature maps for presence of threat objects. Threat objects can include dangerous items that an individual may conceal on their person, for example, guns, knives, and explosives. Automatic threat recognition process 145 may identify threats using, for example, a classifier that assesses the feature maps generated by reconstruction process 140. The classifier may train on known threat images.

Renderer 150 generates or renders an image characterizing the outcome of the threat recognition 145 analysis. The image is rendered on display 155. For example, renderer 150 can illustrate an avatar of a scanned person and any identified threats. Renderer 150 can illustrate a characterization that automatic threat recognition 145 did not detect any threats.

Figure 5:
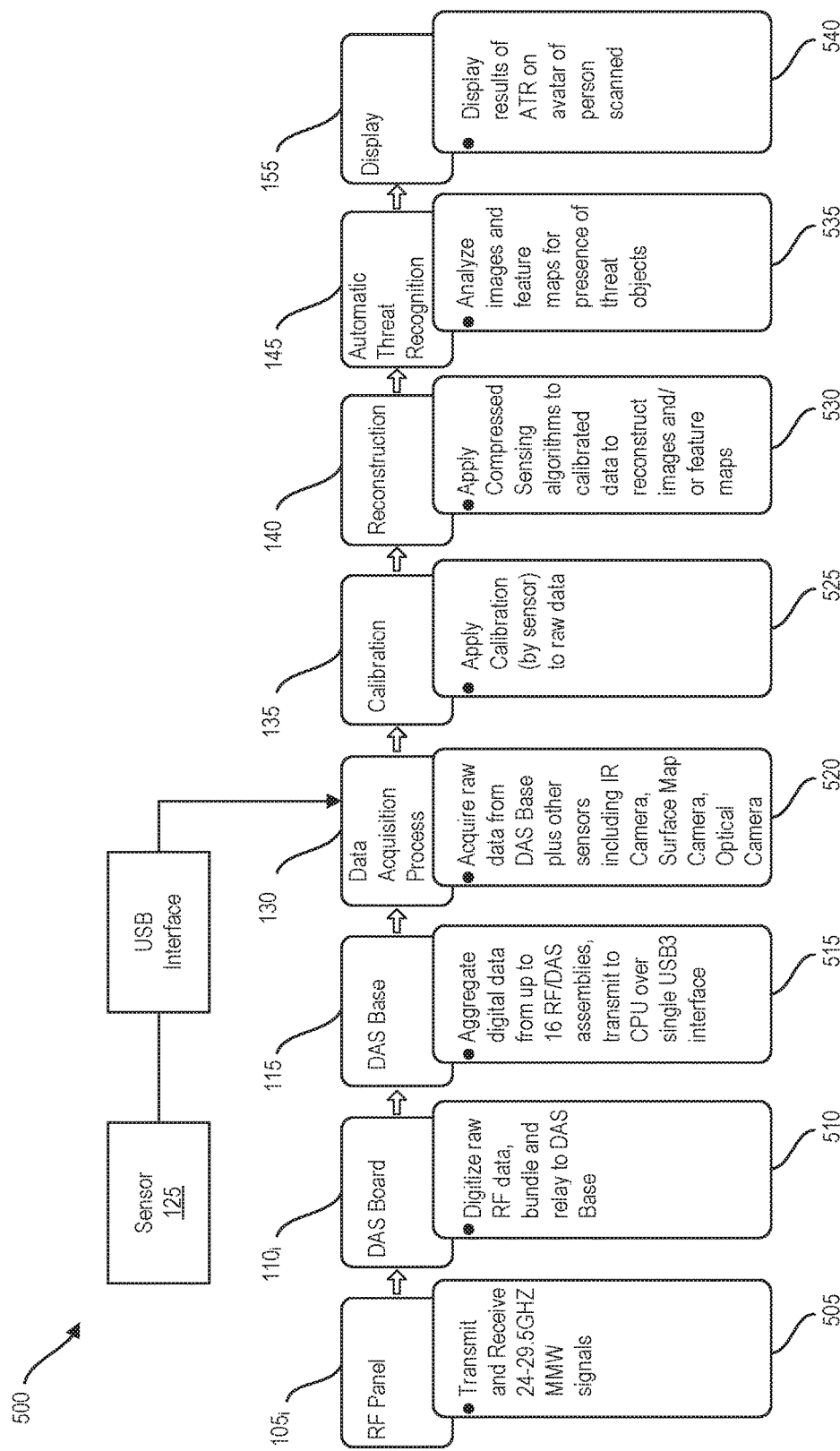
FIG. 5 is a processing block diagram illustrating processing steps of various components of the example modular imaging system.

FIG. 5 is a processing block diagram illustrating processing steps 500 of various components of the example modular imaging system 100. At 505, antenna panels $105_i$ transmit and receive signals at operating frequencies between 24 and 29.5 GHz. The antenna panels $105_i$ receive raw RF radar returns. DAS boards $110_i$ compares these returns against the reference Local Oscillator (transmitted signal) and digitizes the returns to generate a complex valued (in-phase and quadrature), phase coherent, digital data stream, at 510. In addition, DAS boards $110_i$ relay in parallel, their respective digitized data stream to the DAS base station 115.

At 515, DAS base station 115 aggregates the digitized data from each of the DAS board $110_i$. In the example implementation of the modular imaging system 100 shown in FIG. 1 and FIG. 5, the DAS base station 115 can interface with up to 16 DAS boards $110_i$, although in other implementations, the DAS base station 115 can interface with additional DAS boards $110_i$. DAS base station 115 transmits the aggregated data to processing system 120.

At 520, data acquisition process 130 receives the aggregated data from DAS base station 115 and receives information images from sensor 125. Data acquisition process 130 synchronizes timing and publishes the acquired data in frames.

At 525, calibration process 135 applies calibration to the published data on a sensor by sensor basis.

At 530, reconstruction process 140 applies compressed sensing solving algorithms to the calibrated data to reconstruct images and/or feature maps. Reconstruction process 140 can reconstruct images for each transmit/receive pair of panels. In addition, reconstruction process 140 can determine a spatial location of a target in the OD from the image derived from sensor 125 and, based on the spatial location of the target, determine a sparsity constraint for use in the compressed sensing solving algorithms. Other sensors may yield other types of "constraints/priors" to aid the compressed sensing solving algorithms in similar ways. In some implementations, the image derived from sensor 125 is a surface map image or depth map image (e.g., generated by a surface map camera) that contains information relating to the distance of the surfaces of scene objects from the sensor 125 viewpoint or another viewpoint.

At 535, automatic threat recognition process 145 analyzes the images and/or feature maps, for example, using a classifier, for the presence of threat objects. An indication or characterization of the presence of a threat object is provided to renderer 150, which, at 540 displays in display 150 the indication of the presence of the threat object on an avatar of the target in the OD 107.

Figure 6:
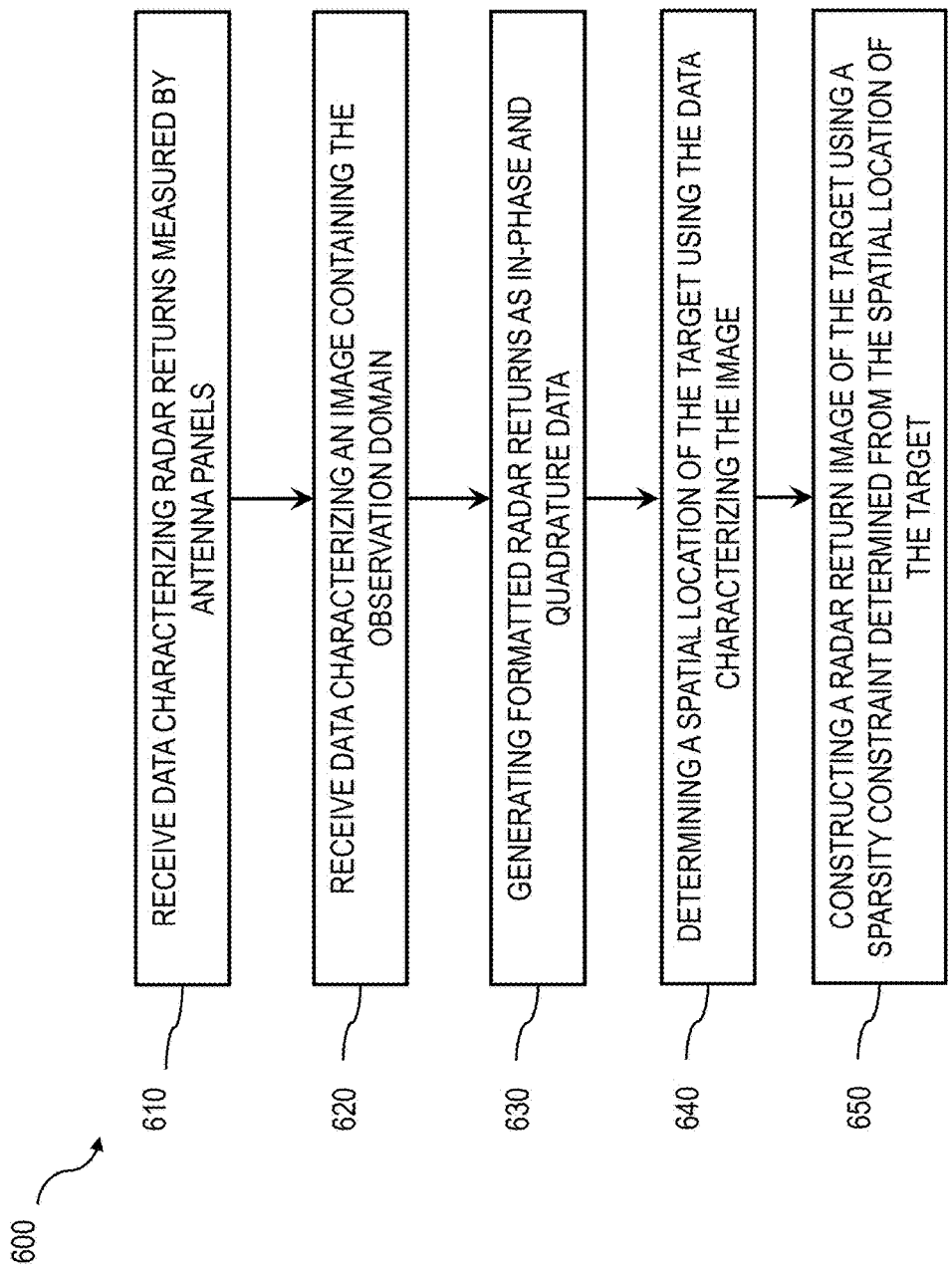
FIG. 6 is a process flow diagram illustrating a process of constructing a radar return image from data measured by a plurality of antenna panels.

FIG. 6 is a process flow diagram illustrating a process 600 of constructing a radar return image from data measured by a plurality of antenna panels $105_i$.

At 610, data characterizing radar returns are received. The radar returns having been measured by a plurality of antenna panels $105_i$ comprising an array of antenna elements including at least two antenna elements that are sparsely distributed on the antenna panel $105_i$ (e.g., separated by a spacing more than a half wavelength of the operating frequencies). The plurality of antenna panels $105_i$ being configurable to be arranged to measure a target in an observation, for example, as described in the system of FIG. 1. The plurality of antenna panels $105_i$ can be configurable to be spatially arranged and oriented with respect to one another based on an intended application.

At 620, data characterizing an image containing the OD is received. The image can be measured by a sensor 125 having a field of view overlapping with the OD. The sensor 125 can include an infrared sensor, electro/optical sensor, surface map camera, and the like.

At 630, data characterizing the radar returns can be generated as complex, phase coherent (e.g., in-phase and quadrature) data. The in-phase and quadrature data can be generated from the analog reception of the RF signal at antenna panel $105_i$ and by comparing the analog reception against a reference RF signal whose comparative result is relayed to $110_i$ were it is digitized.

At 640, a spatial location (for instance) of the target can be determined using the data characterizing the sensor image (other types of information from other sensor may also be generated. The spatial location (or other information) of the target can define empty voxels and occupied voxels (e.g., voxels in which the target is present) (or other priors) in the OD.

At 650, a radar return image of the target can be constructed using a sparsity constraint determined from the spatial location of the target (or other priors from other sensors). The sparsity constraint can include considering empty voxels to have zero values for compressed sensing reconstruction algorithms. Feature maps may be generated and the presence of threat objects in the OD may be detected for using the images and/or feature maps. In some implementations, a characterization of the detected threat objects may be displayed, for example, with an avatar of a person indicating the location of the threat object on the person.

Although a few variations have been described in detail above, other modifications or additions are possible. For example, the number of antenna panels is not limited and some implementations may include any number of antenna panels, which may be configurable and/or reconfigurable based on the intended application. The antenna panels are not limited to a particular frequency, for example, antenna panels with different properties (operating frequencies, element locations, and the like) can be used. In some implementations, an already implemented system can have the antenna panels swapped or exchanged for antenna panels and DAS panels with differing properties (operating frequencies, element locations, and the like). Different compressed sensing reconstruction algorithms may be used and different features may be used for threat detection. The OD may be a single continuous region or multiple separate regions. Other implementations are possible.

Without in any way limiting the scope, interpretation, or application of the claims appearing below, a technical effect of one or more of the example implementations disclosed herein may include one or more of the following, for example, modular antenna panels can serve as building blocks to allow for optimal location. The location can be based on intended applications to better illuminate an individual being screened and eliminate blind spots, which can improve probability of detection while reducing false alarm rates. The modular antenna panels can be solid state and the system can have no moving parts, which increases image acquisition frame rates enabling walk-thru/walk-by and overt or covert operation versus conventionally deployed mechanically scanning devices, operational life and reduces maintenance costs. In some configurations, the modular antenna panels can screen individuals walking in near proximity, thereby eliminating the need for screened individuals to remain stationary during the imaging process. Compressed sensing can reduce the amount of data that is measured, which can reduce the amount of data processed, which can reduce system cost, required processing time, size (e.g., footprint), and the like. In addition, any number of modular antenna panels can be used, allowing the system to scale based on intended application. Additional antenna panels can improve resolution, while fewer antenna panels can lower cost.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a plurality of antenna panels comprising an array of antenna elements including at least two antenna elements separated by a spacing more than a half wavelength, the plurality of antenna panels are configurable to be spatially arranged and oriented with respect to one another to measure radar returns of an observation volume for a target;
    an optical sensor having a field of view overlapping the observation volume and for measuring an optical image; and
    at least one data processor forming part of at least one computing system and adapted to receive data characterizing the optical image and the radar returns, determine a spatial location of the target using the data characterizing the optical image, determine a sparsity constraint using the determined spatial location of the target, and construct a radar return image of the target using the determined sparsity constraint and the radar returns, wherein the spatial location of the target defines empty voxels and voxels in which the target is present.

2. The system of claim 1, further comprising:
    a base station to at least receive the radar returns from the plurality of antenna panels and generate the data characterizing the radar returns as in-phase and quadrature data;
    a display;
    wherein the at least one data processor forming part of at least one computing system is further adapted to detect for a presence of threat objects in the radar return image; and
    wherein the at least one data processor forming part of the at least one computing system is further adapted to render, in the display, characterizations of the detected threat objects.

3. The system of claim 1, wherein the plurality of antenna panels are configurable to be spatially arranged and oriented with respect to one another based on an intended application.

4. The system of claim 1, the plurality of antenna panels including:
    four approach panels arranged vertically with respect to one another and coplanar in a first plane;
    four rearward panels arranged vertically with respect to one another and coplanar in a second plane;
    wherein an angle between the first plane and the second plane is between 10 degrees and 170 degrees.

5. The system of claim 4, wherein the angle between the first plane and the second plane is between 60 degrees and 120 degrees.

6. The system of claim 4, wherein the four approach panels span a vertical distance less than 160 centimeters and each panel's vertical dimension is between 20 and 30 centimeters.

7. The system of claim 5, the plurality of antenna panels further including:
    a second set of four approach panels; and
    a second set of four rearward panels, with a pass-through region between the four approach panels and the second set of approach panels.

8. The system of claim 1, further comprising:
    a housing having a first hinge to fold the housing, the housing coupled to the plurality of antenna panels, the plurality of antenna panels including four panels coplanar in a first plane.

9. The system of claim 8, wherein the plurality of antennas further include a fifth panel coupled to the housing with a second hinge.

10. The system of claim 8, wherein the system is collapsible by folding the housing using the first hinge so that each panel in the plurality of antenna panels is enclosed by the housing.

11. The system of claim 8, wherein, when the housing is in a closed position, a largest dimension of the housing is less than 50 centimeters, and a second dimension of the housing is between 27 centimeters and 40 centimeters.

12. The system of claim 1, the plurality of antenna panels including at least nine coplanar panels in a row and column arrangement, each panel separated from a neighboring panel by between 4 and 8 centimeters.

13. The system of claim 1, the plurality of antenna panels including:
    a first set of two approach panels arranged vertically with respect to one another and coplanar in a first plane;
    a second set of two approach panels arranged vertically with respect to one another and coplanar in a second plane;
    wherein an angle between the first plane and the second plane is between 100 and 170 degrees.

14. The system of claim 13, wherein the two approach panels in the first set are separated vertically by between 30 and 60 centimeters.

15. A method comprising:
    receiving, by at least one data processor, data characterizing radar returns measured by a plurality of antenna panels comprising an array of antenna elements including at least two antenna elements separated by a spacing more than a half wavelength, the plurality of antenna panels are configurable to be spatially arranged and oriented with respect to one another to measure radar returns of an observation volume for a target;

receiving, by at least one data processor, data characterizing an optical image containing the observation volume and measured by an optical sensor having a field of view overlapping with the observation volume;

determining a spatial location of the target using the data characterizing the optical image;

determining a sparsity constraint using the determined spatial location of the target; and constructing a radar return image of the target using the determined sparsity constraint and the radar returns, wherein the spatial location of the target defines empty voxels and voxels in which the target is present.

16. The method of claim 15, further comprising:

generating, by a base station receiving the radar returns from the plurality of antenna panels, the data characterizing the radar returns as in-phase and quadrature data;

automatically detecting for a presence of threat objects in the radar return image; and rendering, in a display, characterizations of the detected threat objects.

17. The method of claim 15, wherein the plurality of antenna panels are configurable to be spatially arranged vertically adjacent to one another to inspect targets moving through the observation volume.

18. A non-transitory computer program product which, when executed by at least one data processor forming part of at least one computer, result in operations comprising:

receiving, by at least one data processor, data characterizing radar returns measured by a plurality of antenna panels comprising an array of antenna elements including at least two antenna elements separated by a spacing more than a half wavelength, the plurality of antenna panels are configurable to be spatially arranged and oriented with respect to one another to measure radar returns of an observation volume for a target;

receiving, by at least one data processor, data characterizing an optical image containing the observation volume and measured by an optical sensor having a field of view overlapping with the observation volume;

determining a spatial location of the target using the data characterizing the optical image;

determining a sparsity constraint using the determined spatial location of the target; and constructing a radar return image of the target using the determined sparsity constraint and the radar returns, wherein the spatial location of the target defines empty voxels and voxels in which the target is present.

19. The non-transitory computer program product of claim 18, the operations further comprising:

generating, by a base station receiving the radar returns from the plurality of antenna panels, the data characterizing the radar returns as in-phase and quadrature data;

automatically detecting for a presence of threat objects in the radar return image; and rendering, in a display, characterizations of the detected threat objects.

20. The system of claim 1, wherein constructing the radar return image includes solving an underdetermined linear system using compressed sensing.

21. The system of claim 1, the at least one data processor further adapted to determine three dimensional surfaces within the observation volume.

* * * * *